US006470825B1

(12) United States Patent
Johnson, III et al.

(10) Patent No.: US 6,470,825 B1
(45) Date of Patent: Oct. 29, 2002

(54) ELECTRONIC LIVESTOCK BREEDING AND MANAGEMENT SYSTEM

(76) Inventors: Fred H. Johnson, III, 2141 Pierce Cir., Salem, OH (US) 44460; Darrell L. Wilkes, 16088 Quarryhill Dr., Parker, CO (US) 80134

( * ) Notice: Subject to any disclaimer, the term of this patent is extended or adjusted under 35 U.S.C. 154(b) by 0 days.

(21) Appl. No.: 09/712,564

(22) Filed: Nov. 14, 2000

Related U.S. Application Data

(60) Provisional application No. 60/165,501, filed on Nov. 15, 1999.

(51) Int. Cl.[7] .................................................. A01K 1/00

(52) U.S. Cl. ..................................... 119/51.02; 119/840

(58) Field of Search .............................. 119/51.02, 840; 340/573.3; 604/349

(56) References Cited

U.S. PATENT DOCUMENTS

| | | | | |
|---|---|---|---|---|
| 4,463,353 A | * | 7/1984 | Kuzara | 340/825.54 |
| 4,617,876 A | | 10/1986 | Hayes | 119/155 |
| 4,690,678 A | * | 9/1987 | Douglas-Hamilton | 604/349 |
| 5,183,008 A | * | 2/1993 | Carrano | 119/155 |
| 5,542,431 A | | 8/1996 | Starzl et al. | |
| 5,595,144 A | * | 1/1997 | Loher | 119/840 |
| 5,673,647 A | | 10/1997 | Pratt | |
| 6,000,361 A | * | 12/1999 | Pratt | 119/51.02 |
| 6,049,280 A | * | 4/2000 | Andersson | 340/573.3 |
| 6,135,055 A | * | 10/2000 | Pratt | 119/51.02 |

FOREIGN PATENT DOCUMENTS

JP 355096855 A * 7/1980 .............. F24F/7/08

* cited by examiner

Primary Examiner—Peter M. Poon
Assistant Examiner—Bethany L Griles
(74) Attorney, Agent, or Firm—Fay, Sharpe, Fagan, Minnich & McKee, LLP

(57) ABSTRACT

A method and system enhances automated management and breeding of animals. The animals are identified by system of radiotelemetric communication of identification data and location. When the animals are ready to be bred, they can be fitted with a heat cycle detection and transmission system for communication of the data in concert with the identification data. The system thus appropriately determines when an animal is ready to be bred so that it can be caught in a catch pen system having system controlled access gates. The animal's natural inclination to go to a bait is exploited so that upon such normal and routine movement to bait, such as water, the access gates can be selectively controlled to direct animals into a plurality of catch pens wherein they are somewhat segregated so that the inventory therein is generally associated by common optimal times for breeding. The system detects and monitors the animals within the individual catch pens and will signal a pen rider that a particular catch pen inventory should be forwarded to a pre-breeding sorting pen area, also including system controlled access gates for enhanced sorting of the breeding animals by optimal times for the breeding. Egress gates from the pre-breeding sorting pens are also system controlled for releasing animals to a breeding barn for technician assisted breeding. The system allows supplemented identification of each animal's data file with the relevant breeding information.

19 Claims, 4 Drawing Sheets

ELECTRONIC LIVESTOCK BREEDING AND MANAGEMENT SYSTEM

This application claims the benefit of U.S. Provisional Application No. 60/165,501, filed Nov. 15, 1999.

FIELD OF THE INVENTION

The present invention relates generally to the management and breeding of animals such as cattle for automatic control of animal location to facilitate the breeding at an optimal time.

The invention more particularly relates to a processor control and catch pen system wherein the animals are monitored for heat cycle condition and then lured and caught in a catch pen system having an automatically controlled access gate based on the detected heat cycle data and animal proximity.

BACKGROUND OF THE INVENTION

Animals, particularly cattle, have been selectively mated for centuries to produce offspring for the purpose that the offspring would have greater economic value than that of randomly mated peers. Historically, this was achieved by segregating females into breeding groups to be naturally bred by a bull which is selected for whichever trait or traits he possessed that are deemed advantageous. An improvement over the natural breeding process is provided by being able to artificially inseminate ("AI") females to elite bulls using frozen semen. AI allows for greater genetic progress because one bull can sire hundreds of thousands of offspring compared to perhaps less than a hundred that could be sired naturally over a lifetime. In addition, using bulls of known genetic potential results in a more uniform and predictable calf crop.

AI breeding is a technical undertaking and is both labor and capital intensive. Accordingly, AI is rarely commercially implemented because of the skills required and the cost involved. Cattle breeding is also highly seasonal, therefore, the skills and capital required for AI breeding are largely idle for months out of the year. Outsourcing for AI breeding is available but is also cost prohibitive for most producers.

The labor costs for the identification, management and catching of cattle at optimal times for breeding is expensive. In a typical operation one or two people would detect heat, sort, inseminate and record data for 100 to 150 heads of cattle over a thirty-day period. Even at $150.00 per day labor rate, the labor cost per animal bred is about $30.00 per head. The substantial elimination of such relatively high labor costs for breeding is the problem sought to be overcome by this invention.

The tagging of cattle with electronic ear tags for wireless identification in a location is well known. Such identification systems have even been exploited in cattle handling and sorting systems in cattle feed lots. (See U.S. Pat. No. 5,673,647 to Pratt and the references cited therein.).

Radiotelemetric devices are also known for monitoring and transmitting heat cycle data for a cow to be bred. (U.S. Pat. No. 5,542,431 to Starzl et al.) However, such heat detection systems are merely useful for the identification of the cattle's heat cycle and have not been known in a context for managing and sorting the cattle automatically based on such detected data.

There is a substantial commercial need for a system that can facilitate the automatic management and breeding of animals, such as cattle, based on the detected heat cycle data without intensive labor and capital investment.

BRIEF SUMMARY OF THE INVENTION

A method and system for managing and breeding animals, particularly cattle, comprises identifying the animals and monitoring their heat cycles. The detecting of the heat cycles allows the system to decide when it is appropriate to catch an animal for breeding. The catching of the animal occurs when it regularly goes for a bait such as food or water and can be lured into a catch pen having a system controlled catch pen access gate. The detection device identifies when an animal to be caught is near a particular catch pen access gate portal. When the animal is within the catch pen, the access gate closes and the animal is thus caught in the catch pen.

Another more limited aspect of the present invention is that the system further includes a plurality of pre-breeding sort pens. When the animal inventory from a particular catch pen is released, the animals can be further segregated into pre-breeding sort pens wherein assignment or further catching within one of the sort pens is based on the heat cycles for associating the animals by a time optimal for their breeding.

In accordance with another aspect of the present invention, a processor maintains and records the identifying data for the animals, the heat cycle data and control of the access gates so that upon determining that an animal to be caught is adjacent a particular catch pen, the access gate can be opened to facilitate the luring of the animal within the catch pen with the bait.

In accordance with yet another more limited aspect of the present invention, a chute system is provided including chute gates for controlling animal access to the catch pen and to the pre-breeding sort pen.

In accordance with yet another even more limited aspect of the present invention, the catch pen system, radiotelemetric identification and heat cycle detection equipment, the pre-breeding sort pens, and the chute system for communicating the animals there between, are all capable of portability into a particular breeding area to facilitate system selection of breeding cattle at optimal times, and yet with substantial labor cost savings.

A particular advantage of the subject invention is the automatic catching and sorting of breeding animals for minimizing labor and capital costs in the breeding process.

Other benefits and advantages for the subject new animal management and breeding system will become apparent to those skilled in the art upon a reading and understanding of this specification.

BRIEF DESCRIPTION OF THE DRAWINGS

The invention may take physical form in certain parts and arrangements of parts, the preferred embodiments of which will be described in detail in the specification and illustrated in the accompanying drawings which form a part hereof and wherein.

DETAILED DESCRIPTION OF THE INVENTION

Figure 1:
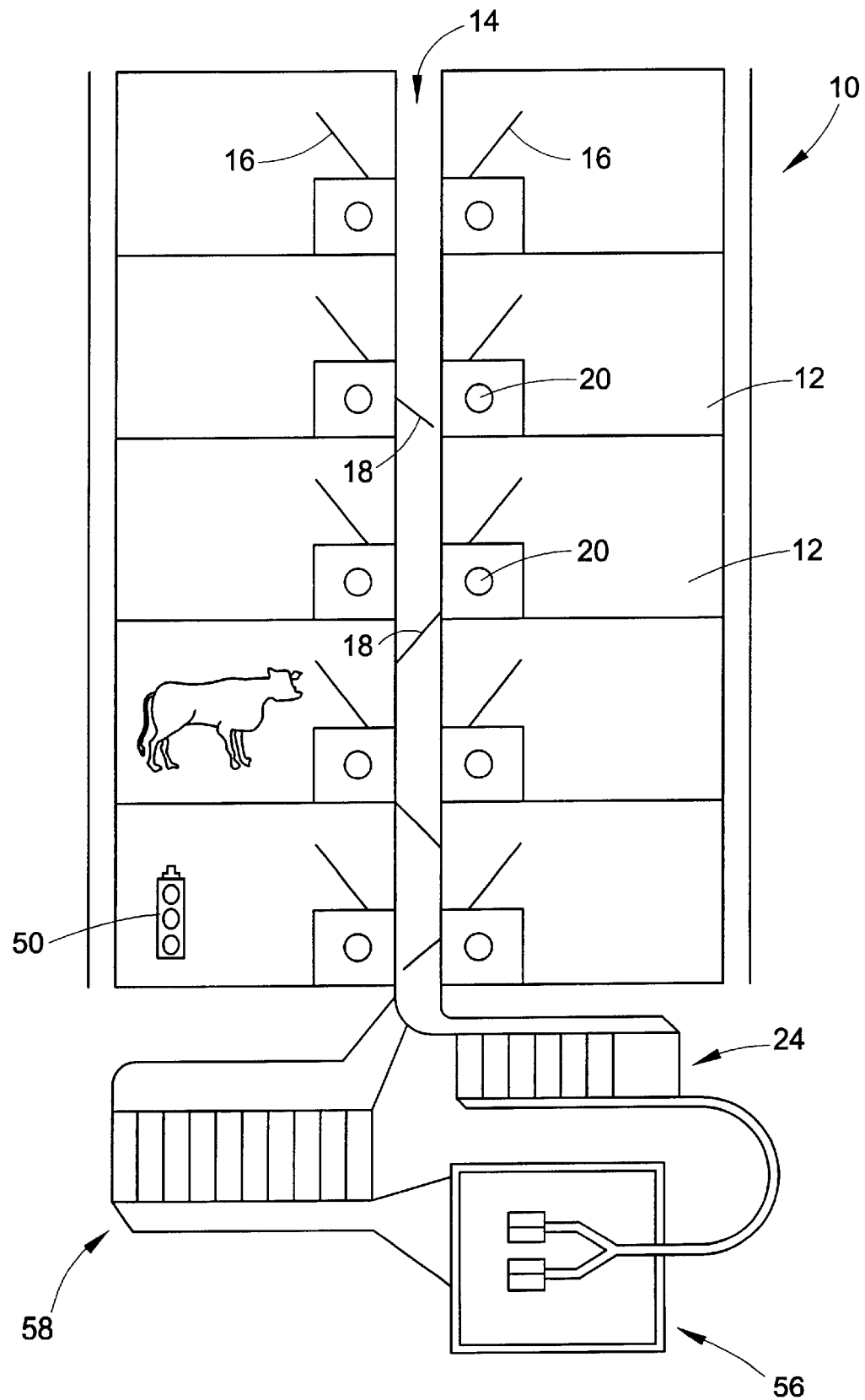
FIG. 1 is a diagrammatic view of a breeding area formed in accordance with the present invention.

Referring now to the drawings wherein the showings are for purposes of illustrating the preferred embodiments of the invention only and not for purposes of limiting same, the Figures show an electronic livestock breeding and management system for automating and facilitating the management and development of preferably virgin beef cattle replacement heifers. The invention is also applicable to other kinds of commercially or domestically bred stock such as horses, buffalo, llamas, pigs or the like.

Figure 3:
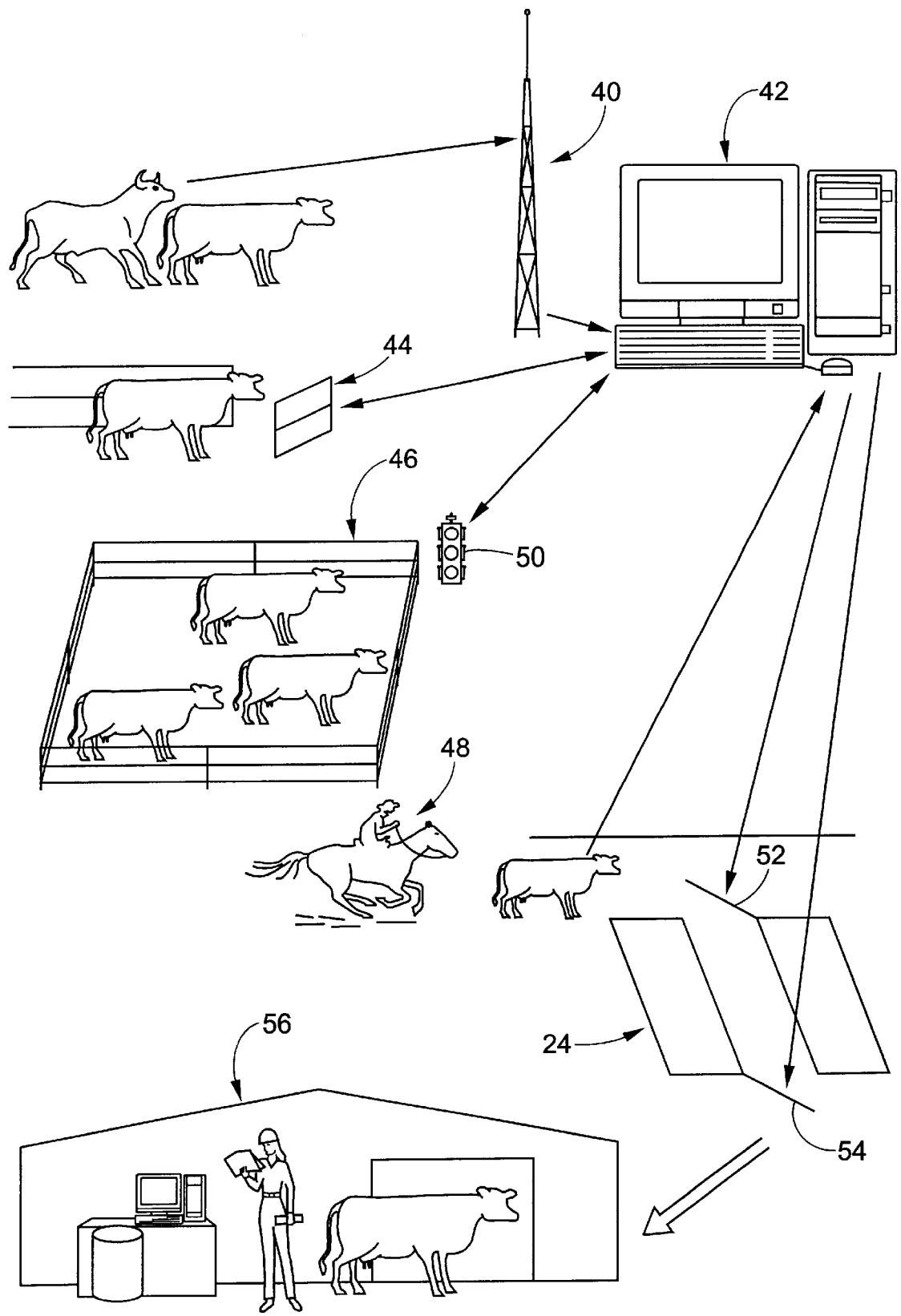
FIG. 3 is a diagram illustrating the components of the present invention.

With particular reference to FIGS. 1 and 3, breeding area 10 is disclosed wherein a plurality of animals to be bred, such as beef cattle, are regularly dispersed. Each of the animals are identified preferably by an electronic radiotelemetric system 40 of the kind that is already well known in the cattle industry, such as is identified above in the Background section of this application. The heifers are also fit with an appropriate heat cycle detector, as also noted above, whose data outputs are also radiotelemetrically communicated to the base processing system 42 so that the system receives a signal representative of the animal identification and its heat cycle. Based on such data, when a determination is made that the animal should be caught for breeding, the system avoids the requirement of manual labor to sort and catch the animal by taking advantage of the animal's regular and normal pen travel routine. For example, cattle regularly come for water or food and at such times the subject invention can automatically catch and sort those animals which are ready for breeding. More particularly, FIG. 1 shows a plurality of catch pens 12 spaced by a chute system 14, access to which is controlled by a plurality of catch pen gates 16 and chute gates 18. When an animal that has been identified as ready for breeding goes to bait, a tag reader adjacent chute 14 or gate 16, 18 identifies the location of the animal to the processing system 42 and the system can then selectively open or close the gate 44 and the animal is lured into the catch pen 12 by the bait. In FIG. 1 it can be seen that each catch pen 12 includes a watering area 20. Each catch pen thus includes a system controlled access gate 16, a detection device (not shown) identifying the animal's location within the pen and bait 20. A plurality of animals are preferably caught in the catch pens 46 and the system 42 monitors their heat cycle until such time as is appropriate, determined by the system, that the catch pen should be emptied and the animals should be forwarded to a subsequent station in the breeding system.

It is within the scope of the invention to allow the animals within the catch pens 12 to naturally exit each catch pen received at down chute 14, although preferably, a pen rider 48 is notified by the system by the light signal 50 that all of the animals for the particular catch pen 12 should be released and forwarded along chute 14 to the pre-breeding sort pens 24. Each catch pen 12 will thus have its own light signal 50 which notifies the pen rider 48 that the catch pen should be emptied at an appropriate time and the animals sent for sorting at the pre-breeding sort pens into an appropriate time bucket. Each of the sorting pens 24 also includes system controlled gates 52, 54 which are controlled by the system to facilitate the pen rider's direction of an identified animal into the proper sorting pen. Location of an animal in a particular sorting pen is thus know to the computer by an animal tag detection and communication device (not shown) and by the continuous communication of heat cycle data through the same communication system. In the pre-breeding sort pens, the animals from any particular catch pen have been segregated by optimal times for breeding and the preexisting records for that animal, all of which are linked in the system 42. At the optimal time for breeding, the animals are directed from the pre-breeding sort pens 24 to the breeding barn 56 where a technician effects insemination of the animal. The animal's identification file is thus supplemented with relevant breeding information and technician remarks, the animal can be released into post breeding sort and return pens 58 and ultimately released to the over all breeding area through the chute system 14.

Thus, it can be appreciated that the animal has been monitored, caught, sorted and bred with substantially reduced operator involvement and consequent minimization of the capital and labor costs normally incurred in the process.

The type of relevant identification data that the system will store, monitor and load includes: origin of the animal, receiving date of animal, age, weight, frame, pelvic area, body type, temperament, fertility score, genetic DNA samples, physical conformation scores, medical treatment received and costs, date and the time an animal is bred, the identity of the technician, technician breeding comments, the sire used, the semen code of the sire used, a pregnancy check date, days pregnant at check, pregnancy remarks by a technician, ultrasound results and images including back fat, ribeye area, and intermuscular fat, hair coat type and pigment, and identification data for heat cycle detection equipment. Historical records could also include records from the original producer, parentage and genetic makeup, previously recorded performance information, or ownership information and sales information. The automation of this record collection system reduces data input cost, provides more accurate records per animal and adds to the sales value of the resulting pregnant female. Such a system also helps to cull out nonviable candidates for breeding and sale and directs an operator to optimize salvage values and save nonproductive costs (such as attempting to breed a non-fertile animal).

It is within the scope of the invention to make the subject system portable so that it may be installed and exported only at those times of the year when breeding is appropriate. For example, the catch pens chute system, pre-breeding sort pens and post-breeding sorter and return pens and breeding barn area can all be of a modular construction to facilitate portability.

Figure 2:
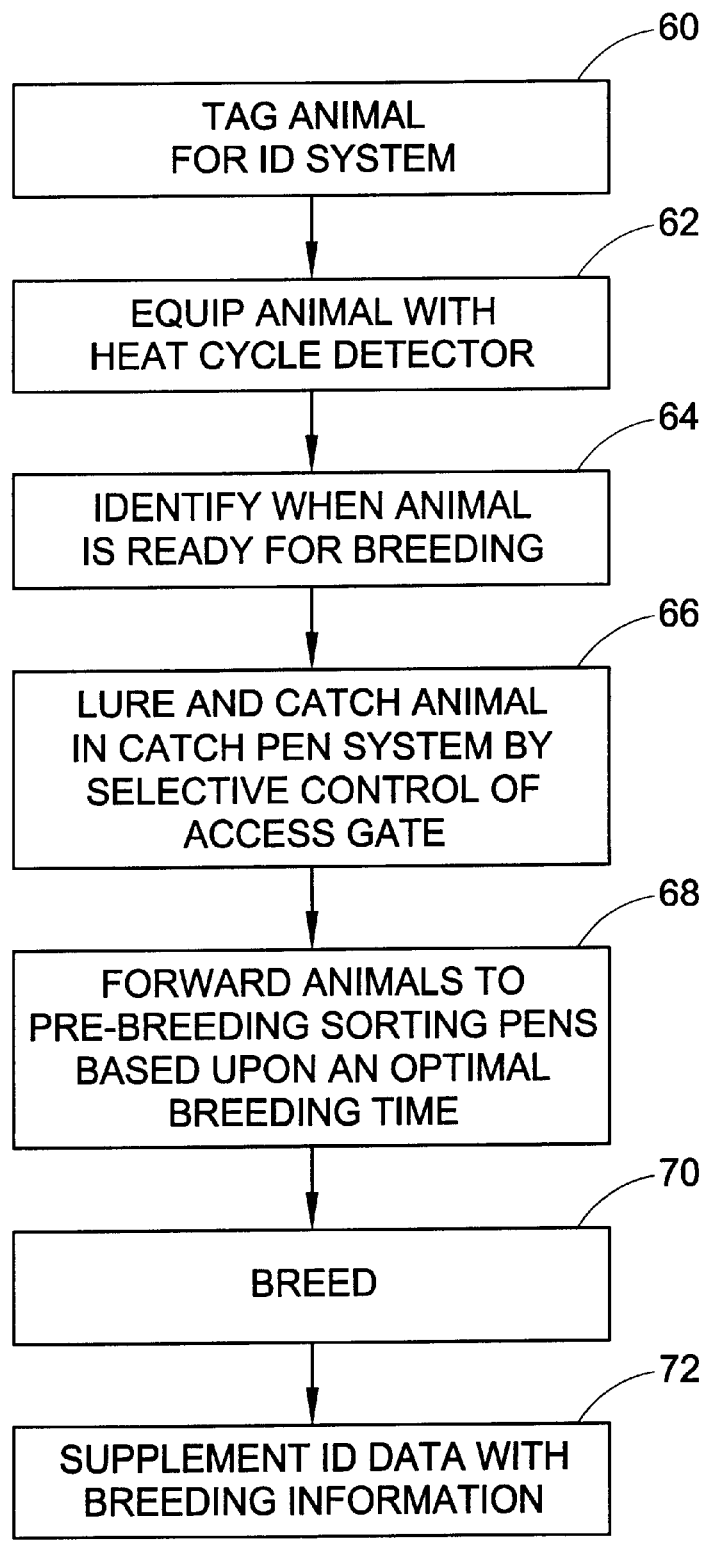
FIG. 2 is a flowchart identifying the steps in the practice of the invention.

With particular reference to FIG. 2, a flowchart illustrating the steps of the subject invention is provided. The first step comprises identifying the animal 60 by a system such as an ear tag and linking the animal identification with the historical or physical data available to the system 42. When it is believed that an animal is ready for breeding, the animal is equipped 62 with the heat cycle detector and the heat cycle data is communicated to the system 42 along with the identification data. Such communication allows the system to identify 64 when an animal is ready for breeding. It is a particular feature of the subject invention that based upon such determination, the system can automatically lure and catch 66 an animal to be bred in the catch pen system by selective control of the catch pen access gates 16, 18 within a chute system 14. When the system determines an optimal breeding time for the inventory of animals within a catch pen, a signal 50 communicates to an operator that the catch pen should be emptied and the access gate is opened so that the animals may be forwarded 68 to pre-breeding sort pens 24. From the sort pens, the animals are communicated to a breeding barn for breeding 70 and the breeding technician supplements 72 system identification data with relevant breeding information as noted above.

The subject invention is believed to be capable at a single installation of breeding approximately 120,000 head of cattle on an annual basis. For such a number of cattle, the minimization of labor costs identified above is believed to conceivably result in approximately $3 million a year in labor costs.

Figure 4:
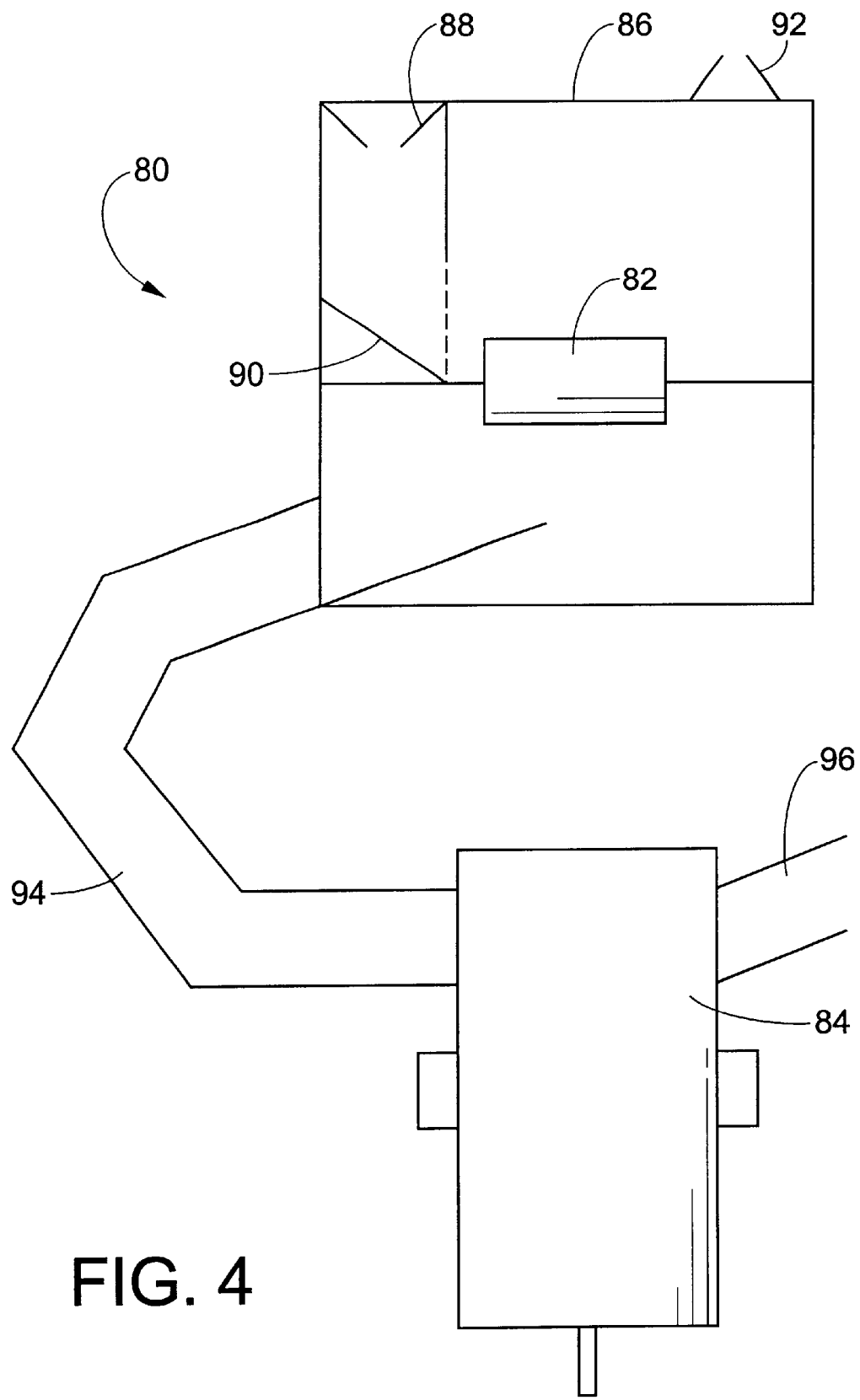
FIG. 4 is a diagram of a portable implementation of the invention.

With particular references to FIG. 4, the subject invention can be advantageously implemented in a readily portable assembly 80 that could be set around any water tank 82 in a pasture. Trailer 84 would house the control components as a portable electronic livestock breeding management system operated by a user in a manner very similar to the system of FIGS. 1 and 3 except that the portable system would probably better accommodate smaller breeding operations, e.g., 100 to 200 head per catch pen used.

A catch pen 86 has gates 88, 90, 92 that can catch and release an animal from the pen 86 based on detected identifications and temperatures. When breeding is appropriate, the animal is directed from the pen area 86, through chute 94 to the trailer 84, where the technician can complete his tasks. The animal can then be released into the pasture through gate 96. When breeding is completed, the entire assembly can be collected and moved to another location.

The invention is described in reference to the preferred embodiments, obviously, modifications and alterations will occur to others upon the reading and understanding of this specification. It is our intention to include all such modifications and alterations insofar as they come within the scope of the pending claims or the equivalents thereof.

Having thus described our invention, we now claim:

1. A method for managing and breeding a plurality of animals, within a breeding area, comprising:

identifying the animals;

simultaneously monitoring a heat cycle of each of the plurality of animals continuously over a period of time;

deciding to catch an animal based on the monitored heat cycle of the animal;

luring the animal in the breeding area to a catch pen, wherein the catch pen includes a system controlled catch pen access gate, a detection device and bait;

detecting the animal within the catch pen; and catching the animal by selectively controlling the catch pen access gate.

2. The method of claim 1 further comprising:

a plurality of pre-breeding sort pens, and further including segregating animals released from the catch pen into selected ones of the pre-breeding sort pens based on the heat cycles for associating the animals by a time optimal for the breeding.

3. The method of claim 2 further comprising:

breeding the segregated animals at a time as determined by the animal inventory within a particular pre-breeding sort pen and preexisting records maintained for the identifying of the animals.

4. The method of claim 2 wherein the pre-breeding sort pens include a system controlled sort pen access gate, and the segregating includes controlling the sort pen access gate based on animal identification and the detected heat cycle.

5. The method of claim 4 wherein the identifying includes recording identification data comprising any of: origin of the animal, receiving date of animal, age, weight, frame, pelvic area, body type, temperament, fertility score, genetic DNA samples, physical conformation scores, medical treatment received and costs, date and the time animal is bred, the identity of the technician, technician breeding comments, the sire used, the semen code of the sire used, a pregnancy check date, days pregnant at check, pregnancy remarks by a technician, ultrasound results and images including back fat, ribeye area, and intermuscular fat, hair coat type and pigment, and identification data for heat cycle detection equipment.

6. The method of claim 2 further including determining a time for releasing the animals from the catch pen based on animal inventory within a particular catch pen and the detected heat cycles.

7. A system for managing and breeding animals originally disposed within a pen area, comprising:

an identification system for identifying the animals with selected identification data and for monitoring animal location;

a heat cycle detection system for simultaneously monitoring a breeding heat cycle of each animal, the heat cycle detection system including a heat cycle detector arranged on each monitored animal;

a processor for determining the optimal time for breeding a particular animal; and, a catch pen system including a gate selectively controlled by the processor based upon the location of the animal and the optimal time for breeding, so that a particular animal can be lured into the catch pen through a processor-controlled gate when appropriate.

8. The system as defined in claim 7 wherein the catch pen system further comprises:

a plurality of catch pens including animal bait, a chute system for directing animal movement relative to the catch pens and an animal presence transmitter communicating animal location adjacent to the gate to the processor.

9. The system as defined in claim 7 further including a plurality of pre-breeding sort pens for receiving the animals released from the catch pens based upon a determination of the processor that the animals in a particular catch pen should be released and segregated in the pre-breeding sort pens by times optimal for the breeding.

10. The system as defined in claim 9 wherein the chute system further includes a chute gate for controlling animal access to the catch pens and to the pre-breeding sort pens.

11. The system as defined in claim 7 further including a signaling system for signaling pen release times.

12. The system as defined in claim 7 further including a breeding barn and post breeding sort and return pens.

13. The system as defined in claim 7 wherein the catch pen system is selectively portable relative to the pen area.

14. The system as defined in claim 7 wherein the animals comprise cattle and the animal bait comprises water.

15. The system as defined in claim 7 wherein the identification data comprises any of: origin of the animal, receiving date of animal, age, weight, frame, pelvic area, body type, temperament, fertility score, genetic DNA samples, physical conformation scores, medical treatment received and costs, date and the time animal is bred, the identity of the technician, technician breeding comments, the sire used, the semen code of the sire used, a pregnancy check date, days pregnant at check, pregnancy remarks by a technician, ultrasound results and images including back fat, ribeye area, and intermuscular fat, hair coat type and pigment, and identification data for heat cycle detection equipment.

16. The system as defined in claim 7 wherein the animals comprise any of: horses, buffalo, llamas or pigs.

17. The method of claim 1, wherein the step of simultaneously monitoring a heat cycle of each of the plurality of animals includes:

monitoring the heat cycle during a regular and normal pen travel routine of the animals.

18. A method for managing insemination of a plurality of animals, the method comprising:

arranging the animals in a breeding area;

radiotelemetrically tracking each animal's location within the breeding area;

concurrently radiotelemetrically monitoring each animal's heat cycle simultaneously with the tracking;

confining targeted animals responsive to an indication in the heat cycle and responsive to radiotelemetric tracking placing the targeted animals at a confinement area; and inseminating the confined target animals.

19. The method as set forth in claim 18, further including:

moving at least the confinement area to a second breeding area containing a second plurality of animals; and at the second breeding area, repeating the tracking, monitoring, identifying, confining, and inseminating to inseminate at least a portion of the second plurality of animals.

* * * * *